March 13, 1934.  F. P. MILLER  1,951,101
INSERTED BLADE CUTTER
Filed June 1, 1932
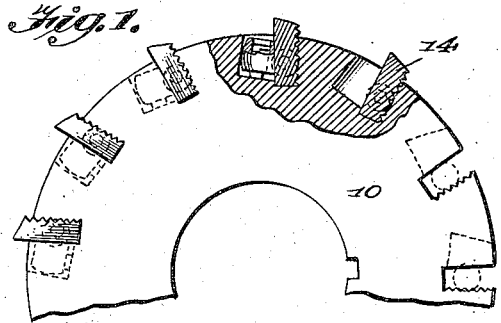
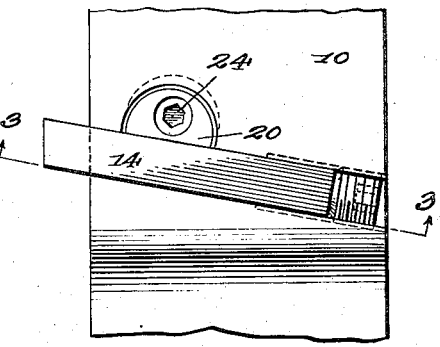
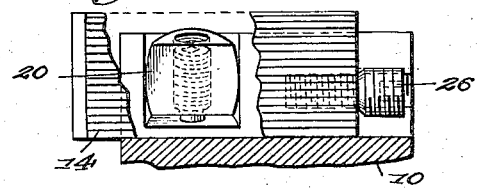
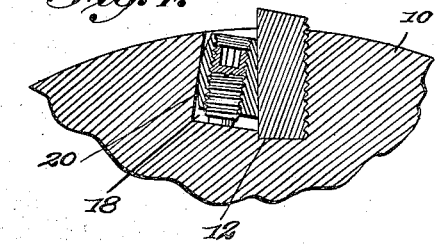
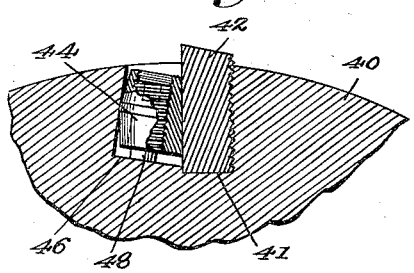
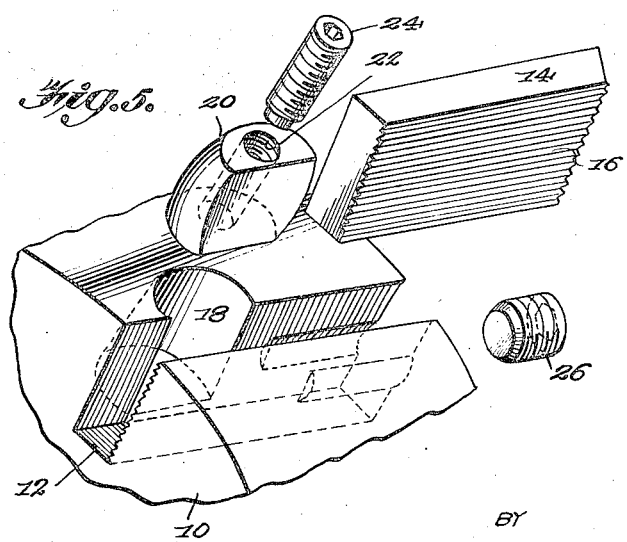
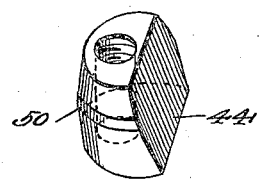
INVENTOR
FRANK P. MILLER
BY
ATTORNEY Patented Mar. 13, 1934

1,951,101

UNITED STATES PATENT OFFICE 1,951,101

INSERTED BLADE CUTTER

Frank P. Miller, Meadville, Pa.

Application June 1, 1932, Serial No. 614,822

8 Claims. (Cl. 29—105)

This invention relates to cutting tools and has special reference to the blade holding means thereof.

In certain of my prior patents, for example, my U. S. patent issued August 21, 1928 and numbered 1,681,675, there is a showing of an inserted blade held in place by a screw pressed wedge with a generous area of contact between the wedge and the adjacent portion of the blade carrier interfering with a uniform pressure contact of the wedge and the blade; and with an appreciation of such interference, the invention forming the subject of this application will be found to embody a wedge relieved toward the inner and outer end portions thereof to define a land having a greatly reduced area of contact with the adjacent portion of the cutter carrier as compared to the corresponding area of contact in the above mentioned patent thereby allowing the wedge to assume the position necessary for uniform pressure contact with the associated blade without interference by a substantial area of contact between the wedge and the blade carrier.

Further the invention will be found to contemplate a cutter which is efficient, of highly simplified construction and relatively cheap to manufacture.

Other objects and advantages will be apparent during the course of the following description.

In the accompanying drawing forming a part of this application and in which like numerals are employed to designate like parts throughout the same, Figure 1 is a fragmentary side elevation of a rotary cutter embodying the invention, Figure 2 is a fragmentary edge elevation of a rotary cutter embodying the invention, Figure 3 is a detailed sectional view taken on line 3—3 of Figure 2, Figure 4 is a detailed sectional view through the cutter, the view illustrating the blade and the wedge in section, Figure 5 is a fragmentary group perspective illustrating the carrier and associated parts, Figure 6 is a detailed transverse sectional view illustrating a slight modification of the invention, and Figure 7 is a perspective of a modified form of wedge shown in Figure 6.

In the drawing, wherein for the purpose of illustration are shown several preferred embodiments of the invention, the numeral 10 designates the body or carrier of a rotary cutter, such as a milling cutter as disclosed, a reamer or any of the other rotary cutters in which the invention might be embodied. As shown in Figure 1, the body 10 is provided with an annular series of slots 12 opening out through the periphery thereof and through opposite ends thereof for the reception of blades 14, there being interfitting serrations 16 between the blades and the side walls of the slots.

As shown in Figures 2, 4 and 5, one side wall of each slot 12 is formed with a recess 18 opening for the full length thereof into the slot and opening out through the periphery of the carrier for the reception of a wedge 20. The wedge is shown to be formed with a threaded opening 22 extending out thru opposite ends thereof for the reception of a set screw 24 by which the wedge might be forced outward into pressure contact with the opposed side wall of the blade 14 and the opposed wall of the recess 18, it being noted that the axis of the recess 18 is inclined outwardly toward the blade and that the recess is diminished in cross-sectional area toward the periphery of the carrier, so that outward movement of the wedge will result in simultaneous lateral movement of the wedge toward the associated blade causing the wedge to have effective binding contact with the blade.

Incidentally, the inner end of the set screw has pressure contact with the bottom wall of the recess 18 while the outer portion of the screw is provided with a polygonal socket or other suitable means by which the screw may be turned by an appropriate tool.

That portion of the surface of the wedge 20 in opposed relation to the wall of the recess 18 is shown to be of more or less convex or spherical form causing the convex surface to recede from the wall of the recess 18 toward the ends of such recess and leaving a circumferential land or bearing band between the ends of the wedge for pressure contact with the wall of the recess 18.

In other words, that portion of the wedge 20 in opposed relation to the wall of the recess 18 is bulged to define an arcuate land or band for rockable pressure contact with the adjacent portion of the wall of the recess 18 allowing the flattened side of the wedge to have uniform pressure contact throughout with the opposed surface of the blade to the end that the blade is held firmly in place.

By thus giving to the wedge 20 the convex or spherical surface as shown in Figures 4 and 5 and leaving the wall of the slot 18 axially straight, a greatly diminished area of contact is provided between the wedge and the wall of the slot 18 with the result that the wedge may not only rotate circumferentially but may also rock axially to produce a universal movement and thus locate the flattened surface of the wedge for uniform pressure contact with the opposed surface of the blade 14.

Lengthwise adjustment of the blades may be accomplished by loosening the screws 24 and advancing or retracting the screws 26 which, as shown in Figures 2 and 3, are threaded into the end portions of the slots 12 for pressure contact with the adjacent ends of the blades. The interfitting serrations 16 will also be found to be useful in the adjustment of the blades, in providing greater rigidity and especially in preventing radial displacement of the blade by the outward movement of the wedge.

In the form of invention illustrated in Figures 6 and 7 the carrier is designated by the numeral 40 and is provided with a series of slots 41 receiving blades 42 held in place by wedges 44.

It is shown in Figure 6 that the wedge is positioned in a recess 46 in one side wall of the slot 41 and is formed with a threaded opening extending entirely therethrough for the reception of a set screw 48, the axis of both the recess and the wedge being inclined outwardly toward the blade to provide a clamping action against the blade as the wedge is forced outwardly by the set screw.

The wedge 44 is shown in Figure 7 to be relieved along straight lines toward the ends thereof to define an arcuate land or band 50 for pressure contact with the wall of the slot 46. The land 50 is not unlike the land produced by the convex surface of the wedge 20 and provides for a greatly diminished area of contact between the wedge and the wall of the receiving recess therefor, so that the wedge may rock slightly in all directions for the purpose of allowing a flat and uniform pressure contact between the flattened surface thereof and the opposed surface of the blade 42.

The foregoing illustrates that the invention forming the subject of this application is capable of a wide variety of mechanical expressions and therefore, it is to be understood that the forms of invention herewith shown and described should be taken merely as preferred examples of the same and that such minor changes in arrangement and construction of parts may be made as will remain within the spirit of the invention and the scope of what is claimed.

Having thus described the invention, what is claimed is:—

1. In an inserted blade rotary cutter, a carrier having a slot opening out through the periphery thereof and having a side wall formed with a recess, said recess being of segmental form and reduced in cross-sectional area toward the periphery of the carrier, a blade in said slot, a segmental wedge rotatably adjustable in said recess and having a flat surface for pressure contact with said blade, and a tensioning screw threaded through said wedge and having the inner terminal portion thereof engaged with the bottom wall of said recess, said segmental wedge having one surface thereof bulged between the ends thereof to form an arcuate land rockably engaging the wall of said recess and cooperating with the first named adjustability of the wedge in allowing the flat surface of the wedge to have uniform pressure contact with the blade.

2. In a cutter, a carrier having a slot provided with side walls, one side wall of the slot being formed with a recess, a wedge in the recess and having a flat surface, a blade in the slot and engaged by the flat surface of said wedge, that portion of the surface of the wedge in opposed relation to the wall of said slot being bulged to define an arcuate land for pressure and rockable contact with the wall of the recess and leaving the end portions of the wedge spaced from the wall of the recess, and a set screw carried by the wedge.

3. In a cutter, a body having a slot provided with a side wall formed with a recess, a blade in said slot, a wedge in said recess and having a flat area for pressure contact with the blade, said wedge being bulged toward an intermediate point to define a land for pressure contact with the wall of said recess leaving the end portions of the wedge spaced from the wall of the recess to allow the wedge to rock about said land, and a locking screw associated with said wedge.

4. In a cutter, a body having a slot provided with a side wall formed with a recess, a blade in said slot, a wedge in said recess and having a flat area for pressure contact with the blade, said wedge being bulged toward an intermediate point to define a land for pressure contact with the wall of said recess leaving the end portions of the wedge spaced from the wall of the recess to allow the wedge to rock about said land, and a tensioning device associated with said wedge.

5. In a cutter, a body having a slot provided with a side wall formed with a recess, a blade in said slot, a wedge in said recess and having a flat area for pressure contact with the blade, said wedge being bulged toward an intermediate point to define a land for pressure and rockable contact with the wall of said recess, and a tensioning device associated with said wedge, said recess being reduced in cross-sectional area toward one end thereof and having axially straight walls.

6. In a cutter, a body having a slot provided with a side wall formed with a recess, a blade in said slot, a wedge in said recess and having an approximately spherical surface defining a circumferential land for rockable pressure contact with the wall of said recess, and a tensioning screw threaded through said wedge, the end portions of said wedge being spaced from the side walls of the recess to allow the wedge to rock.

7. In an inserted blade cutter, a body having a slot provided with a side wall, said side wall being provided with a recess, a blade in the slot, a wedge in the recess and having one side thereof presented to the blade for pressure contact therewith, said wedge being relieved toward opposite ends thereof and having the ends thereof spaced from the wall of the recess thereby defining a land between the ends of the wedge for pressure and rockable contact with the wall of the slot, and a tensioning device associated with said wedge.

8. In a rotary cutter, a body having a slot provided with a side wall having a recess, a blade in the slot, a wedge in said recess and having pressure relation to said blade, said wedge being relieved on substantially straight lines toward the ends of the wedge to define a circumferential land between the ends of the wedge for pressure and rockable contact with the wall of said recess, the end portions of the wedge being spaced from the walls of the recess, and a tensioning device carried by said wedge.

FRANK P. MILLER.